United States Patent [19]

Brandt

[11] 3,970,121
[45] July 20, 1976

[54] LIQUID INJECTOR
[76] Inventor: Michael W. Brandt, P.O. Box 1092, Stillwater, Okla. 74074
[22] Filed: Dec. 13, 1974
[21] Appl. No.: 532,446

Related U.S. Application Data
[63] Continuation-in-part of Ser. No. 462,364, April 19, 1974.

[52] U.S. Cl. ............................... 141/2; 141/18; 141/330
[51] Int. Cl.² ........................................ B65B 3/04
[58] Field of Search ............... 141/2, 18, 3, 20, 1, 141/100, 329, 330, 19, 346, 347, 351, 352

[56] References Cited
UNITED STATES PATENTS
1,390,264  9/1921  Allen et al. ..................... 141/18
3,595,279  7/1971  Jaffe ............................. 141/2

Primary Examiner—Houston S. Bell, Jr.
Attorney, Agent, or Firm—Howard E. Moore; Gerald G. Crutsinger

[57] ABSTRACT

A pressurizable container adapted to spray liquids such as chemical pesticides onto a surface in combination with apparatus to inject a pre-measured quantity of chemical into the container. The injection apparatus comprises a valve secured to the container, a tubular body containing a measured quantity of liquid chemical positioned in sealing relation to the valve, and dispensing apparatus to force the liquid chemical from the tubular body through the valve and into the container. In one embodiment of the apparatus the tubular body comprises a flexible tube. In the second embodiment of the apparatus the tubular body comprises a syringe.

14 Claims, 5 Drawing Figures

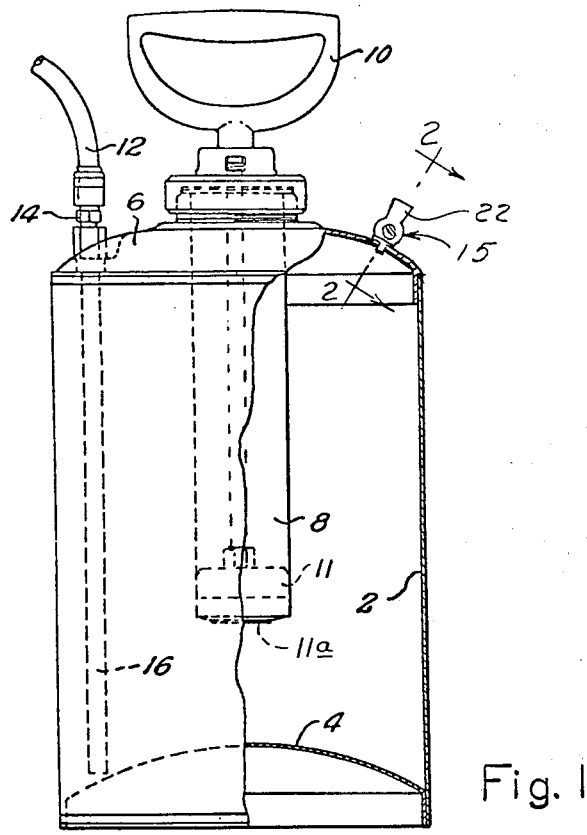
Fig. 1
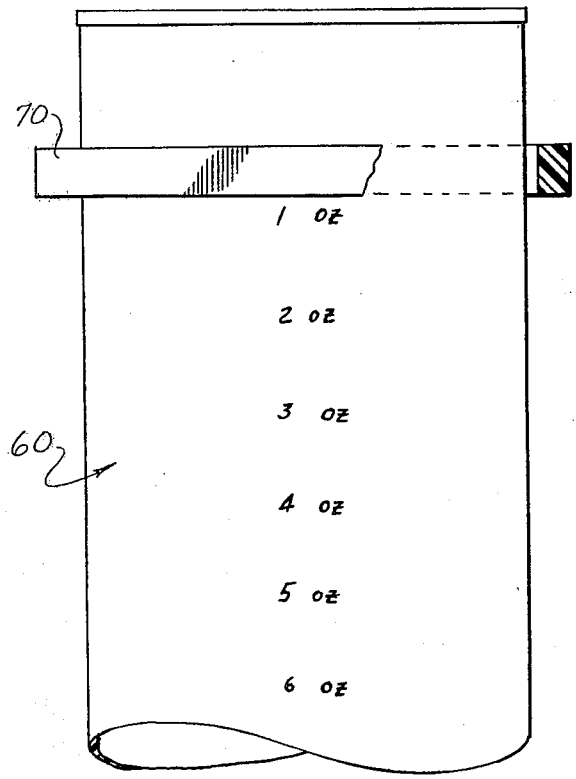
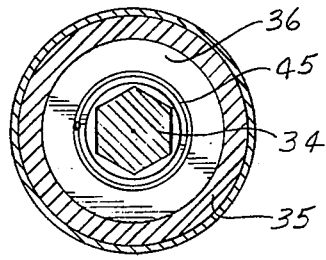
Fig. 3
Fig. 4
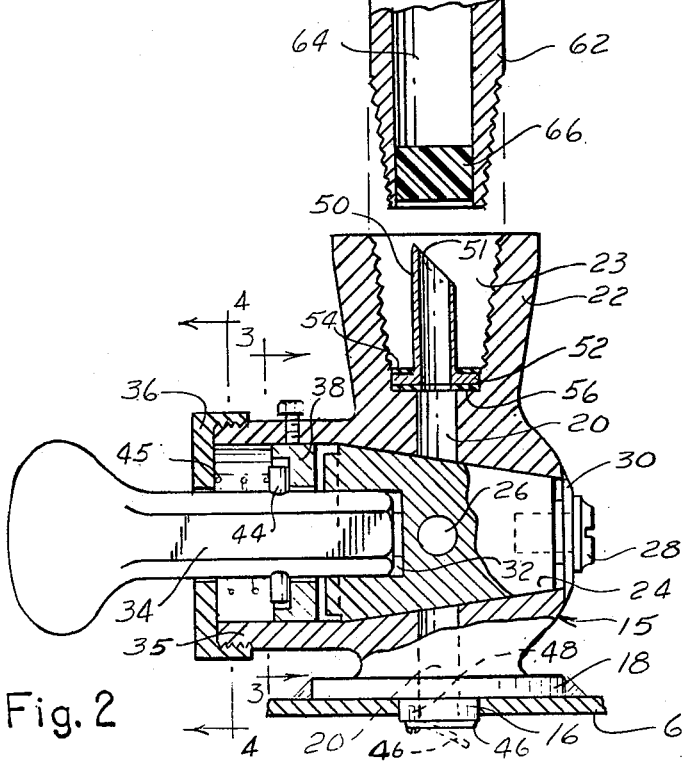
Fig. 2

LIQUID INJECTOR

CROSS-REFERENCE TO RELATED APPLICATIONS

This is a continuation-in-part of my copending application Ser. No. 462,364 filed Apr. 19, 1974 entitled "Chemical Injector."

BACKGROUND

Hazards are encountered in handling chemical pesticides and fertilizers due to the poisonous nature of these chemicals.

Hazards arise when young, uneducated, illiterate, and inexperienced users attempt to introduce chemicals into a sprayer. Dangers arise, from improper handling of such chemicals, both to the user from improper body contact with the chemical and to the crops from improper doses of the chemical.

Plants are harmed when an excessive quantity of pesticide or chemical is applied to them. This is often caused by an inexperienced or illiterate person using the chemical in such a way that plants react adversely to excessive amount of chemical or pesticide. Farmers often issue pesticides to farm workers to apply to crops but the farm worker may be unable to determine the proper quantity or method of application of the specific chemical due to lack of knowledge of the numerous chemicals available.

Likewise nurseries often issue bulk quantities of pesticides and chemicals to inexperienced home gardeners who may not have the proper respect for the dangers of such highly dangerous chemicals and pesticides. Further, one who is experienced in the use of pesticides and chemicals often has a tendency to become careless and mishandle these valuable but dangerous chemicals.

The U.S. Department of Agriculture has released many bulletins, which outline safety rules for pesticide application, admonishing one to read and follow directions on the pesticide container. These rules include mixing the pesticide solutions in a well ventilated area to avoid inhaling the sprays or dusts; the avoidance of mixing flammable solutions around an open flame; avoidance of over application of chemicals onto areas frequented by pets and wildlife; avoidance of harmful over application of chemicals to flowers, ornamental shrubs and other valuable plants; avoidance of chemical contact with skin and clothing including directions to wash away any residue, immediately following handling, with soap and water and to change clothing; and storage of pesticides and chemicals in well labeled containers out of the reach of children and pets. These safety rules have been formulated by the U.S. Agriculture Department to safeguard the public since many people have been poisoned due to the improper use of chemicals.

Often problems develop in the misappropriation of poisons from an agency which issues pesticides and chemicals to employees in a bulk state. Heretofore, the employee has known that there was no way to trace small quantities of these chemicals issued and consequently appropriation of chemicals for his own use has often occured.

This invention is intended to alleviate the above recited problems.

SUMMARY

I have devised a liquid injector to inject a premeasured quantity of liquid from a pre-packaged tubular body into the inside of a mixing container or tank of a compression sprayer employed for applying sprayable solutions, emulsions, or mixtures of pesticides and other agricultural, commercial or industrial chemicals, generally diluted in water.

The container or tank of the compression sprayer has a valve body mounted thereon having a passage communicating with the inside and the outside of the container. A check valve is positioned to prevent flow outwardly through the passage in the valve body in the event the passage is opened while the container is pressurized. A valve element, movable between positions opening and closing the passage, is adapted to prevent inadvertent movement of the valve element.

Two embodiments of the valve body are disclosed.

In the first embodiment a perforating member is employed to perforate a flexible seal element in a passage through a threaded neck on a flexible tube. The seal element wipes liquid from the surface of the perforating element when the tube is disconnected from the valve body and simultaneously closes the passage through the neck of the tube.

In the second embodiment the valve body has a tubular neck to receive a nozzle on a syringe.

The primary object of the invention is to provide a prepackaged and pre-measured quantity of pesticide or chemical for injection into sprayers to prevent errors in measurement the amount of chemical used for mixing solutions of pesticide.

Anther object of the invention is to provide a premeasured quantity of liquid for mixing to form a solution such that workmen who are unable to read will be able to use the chemical safely and accurately.

Another object of the invention is to provide a method of injecting a chemical into a mixing container safely without bodily contact with the chemical.

A further object of the invention is to provide a method of injecting chemicals into a mixing container while minimizing waste or spillage of the chemical.

A further object of the invention is to provide a prepackaged volume of chemicals such that strict supervision of the distribution of chemicals is feasible.

A further object of the invention is to provide apparatus to mix a pre-measured quantity of chemical with water in a sprayer on the job site while minimizing measuring and handling of the chemical.

A still further object of the invention is to provide a container for chemicals which reduces the possibility of releasing dangerous vapors of the chemicals which could harm the user.

A still further object of the invention is to provide a compression sprayer having a valve mounted thereon to permit injection of liquid chemicals thereinto.

Other and further objects of the invention will become apparent upon referring to the detailed description hereinafter following and to the drawings attached hereto.

DESCRIPTION OF DRAWINGS

Drawings of two embodiments of the invention are annexed hereto, so that the invention may be better and more fully understood, in which:

FIG. 1 is an elevational view of a compression pesticide spray container having the chemical injector apparatus connected thereto, parts being broken away to more clearly illustrate details of construction;

FIG. 2 is a cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 2; and

Numeral references are employed to designate like parts throughout the various figures of the drawing.

DESCRIPTION OF A PREFERRED EMBODIMENT

Figure 5:
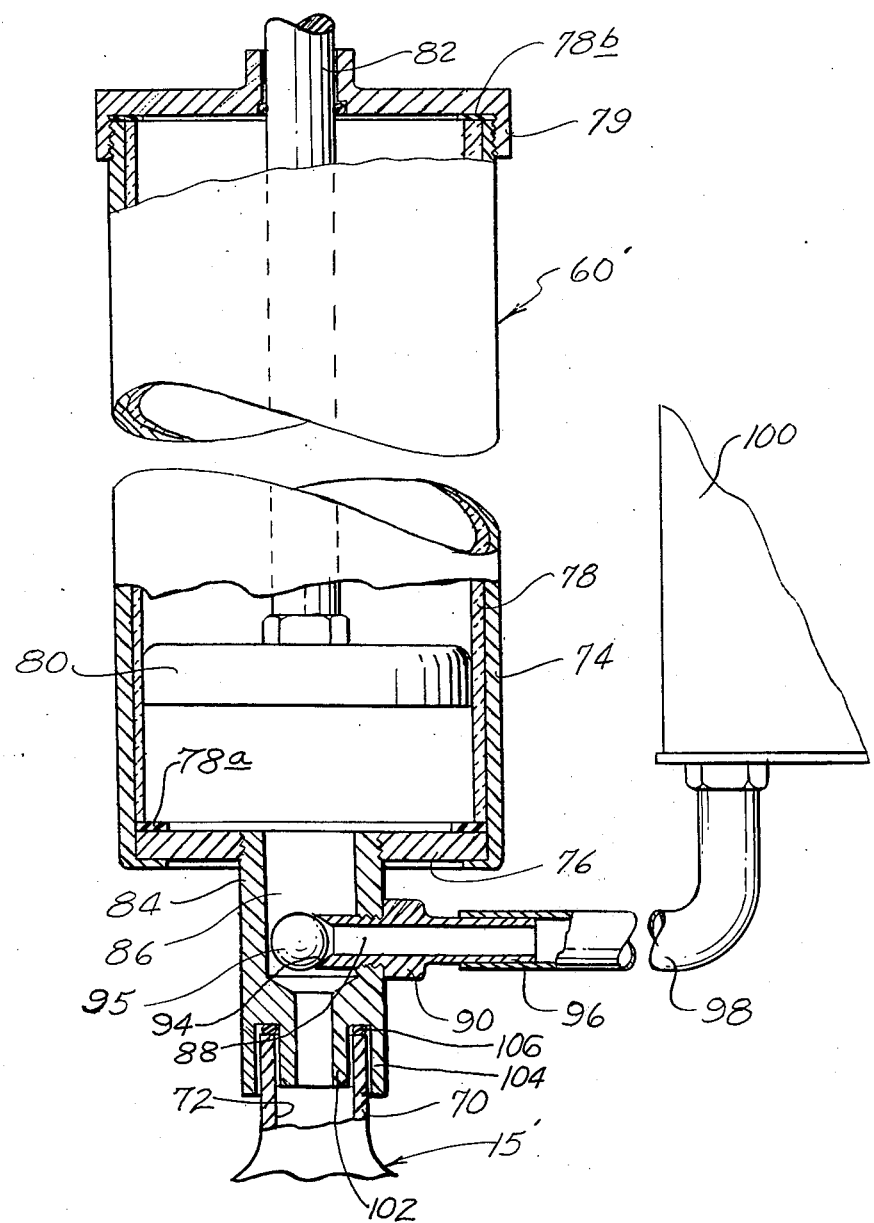
FIG. 5 is a cross-sectional view of a second embodiment of the valve body and syringe associated therewith.

Referring to FIG. 1 of the drawing, the numeral 1 generally designates a cylindrical shaped container having a side wall 2, a bottom 4 welded or otherwise secured to the lower end of the side wall, and a top wall 6. Top wall 6 has an air pump 8 secured thereto communicating with the inside of the container.

The air pump comprises a stuffing box having suitable sealing apparatus therein through which a plunger, having a handle 10 on one end and a piston 11 on the other end, is slidably disposed for pressurizing the container 1 by pumping air thereinto through a check valve 11a. Conventional locking apparatus is employed for detachably securing handle 10 in the position illustrated in FIG. 1 after air has been pumped into the container.

When it is desired to increase pressure inside the container 1, handle 10 is rotated, for example 35° permitting movement thereof relative to container 1 for pumping air into the container and increasing pressure in the container.

A flexible hose 12 is secured by a suitable coupling 14 to a pressure tube 16 having a lower end positioned adjacent to bottom 4 of the container 1.

The other end of hose 12 is secured to a conventional spray gun (not shown) having a trigger actuated valve for controlling flow of pressurized fluid which is dispensed from a nozzle.

Compression spray container 1 and the spray gun are of conventional design and are described herein only to illustrate a suitable form of apparatus to which the injector apparatus is connectable.

As best illustrated in FIGS. 1 and 2 of the drawing a valve body 15 has a nipple 16 extending through an aperture formed in the top wall 6 of container 1. A flange 18 is formed on valve body 15 adjacent nipple 16 and is welded or otherwise secured to the top wall 6.

Valve body 15 has a passage 20 extending therethrough, the lower end of passage 20 extending through nipple 16 and the upper end thereof extending through an internally threaded hub 22.

Valve body 15 has a tapered plug receiving opening formed therein in which a tapered plug-type valve element 24 is rotatably disposed. Valve element 24 has a plug port 26 extending therethrough.

One end of valve element 24 has a threaded bore formed therein which receives threaded retainer screw 28 having a head thereon which engages plug retainer 30 has a non-circular opening formed therein in which the end of valve element 24 is disposed.

It should be appreciated that plug retainer 30 engages valve body 15 and that retainer screw 28 urges the tapered valve element 24 to the right as viewed in FIG. 2 thereby urging the outer surface of the valve element into sealing engagement with the tapered inner surface in the opening formed in valve body 15.

A non-circular socket 32 is formed in the end of valve element 24 and has a complimentarily shaped stem 34 slideably disposed therein.

Valve body 15 has a bonnet 35 extending outwardly from one side thereof adjacent plug receiving opening 23. A valve stem retaining nut 36 is threadedly secured to the outer end of bonnet 35 and has a central opening formed therein through which valve stem 34 slideably and rotatably extends.

A locking disc 38 has a circular opening 39 extending through a central portion thereof and has a radially extending groove 40 formed therein. Locking disc 38 is positioned in bonnet 35 and is retained against longitudinal and rotational movement by a set screw 42.

Stem 34 has a locking pin 44 extending transversely therethrough and a stem locking spring 45 is positioned about stem 34 and has opposite ends engaging stem locking pin 44 and retaining nut 36.

It should be readily apparent that port 26 formed in valve element 24 cannot be rotated to a position wherein opposite ends of port 26 are in alignment with passage 20 through valve body 15 unless an outwardly directed force is exerted on stem 34 to disengage locking pin 44 from groove 40 in locking disc 38.

Nipple 16 on valve body 15 has a flexible check valve 46 secured thereto by a set screw 48. Check valve 46 is urged into sealing engagement with the lower end of nipple 16 if pressure within container 1 exceeds pressure in passage 20 extending through valve body 15. However, when pressure in passage 20 exceeds pressure in container 1 the flexible check valve is deflected to the position indicated at 46' in FIG. 2 of the drawing permitting flow of fluid into container 1.

A hollow perforating member 50 is positioned in threaded passage 23 formed in hub 22. Perforating member 50 preferably comprises a hollow pointed needle having a flanged end 52 which is received in threaded passage 23 to maintain passage 51 through perforating element 50 aligned with passage 20 extending through valve body 15. Resilient gaskets 54 and 56 are secured to upper and lower surfaces of flange 52 as will be hereinafter more fully explained.

Chemical pesticide or other suitable liquid is delivered from a tubular body 60 into passage 20 formed in valve body 15.

In the particular embodiment of the invention illustrated in FIG. 2 of the drawing, tubular body 60 comprises a flexible tubular container from which liquid is dispensed by squeezing. Tube 60 has an externally threaded neck 62 having an outlet opening 64 extending therethrough. A flexible resilient seal element 66 is positioned in outlet opening 64 in neck 62 to prevent flow of liquid through outlet opening 64. Seal element 66 may comprise any suitable material such as neoprene.

The operation and function of the apparatus hereinbefore described is as follows:

Before injecting liquid pesticide or other chemical into container 1, container 1 should be vented to atmosphere. The neck 62 on tube 60 is positioned in threaded opening 23 in hub 22 on valve body 15. Upon rotation of tube 60 flexible seal element 66 is moved into engagement with the pointed end on perforating element 50 which is urged through seal 66 forming an opening therethrough. Perforating element 50 has a length which is sufficient to position the pointed upper end thereof inside outlet opening 64 in neck 62 when the lower end of neck 62 is rotated into sealing engagement with gasket 54 secured to flange 52 on perforating element 50.

Outwardly directed force is applied to stem 34 to move locking pin 44 out of groove 40 formed in locking disc 38. After locking pin 44 has moved a sufficient distance to disengage groove 40 stem 34 is rotated 90° to align port 26 extending through valve element 24 with the passage 20 extending through valve body 15.

Tube 60 preferably has indicia printed on the outer surface thereof to indicate the volume of liquid dispensed from tube 60 when slotted dispenser clip 70 is moved to a position adjacent the indicia.

Thus, if one ounce of liquid is to be dispensed from tube 60 through passage 20 into container 1, clip 70 would be positioned over the end of tube 60 and moved to the position illustrated in FIG. 2.

After the desired volume of liquid has been dispensed into container 1, tube 60 is disengaged from threaded passage 23 in hub 22 thereby extracting perforating element 50 from flexible seal 66 in neck 62 of tube 60. When perforating element 50 is disengaged from seal element 66, the resilient material will expand to its original dimensions thereby closing the passage formed by perforating element 50. Thus seal element 66 closes outlet passage 64 after removal from perforating element 50 and wipes any liquid remaining on the outer surface of perforating element 50 therefrom.

It should be readily apparent that employment of the apparatus hereinbefore described in the process set forth above permits injection of a measured quantity of liquid into container 1 while eliminating the hazards heretofore encountered in opening a container, measuring a volume of liquid, pouring the liquid into container 1 and resealing the container.

SECOND EMBODIMENT

Structure employed in the second embodiment of the invention, illustrated in FIG. 5, is similar to that employed in the first embodiment hereinbefore described. Therefore, only structure differing from that of the first embodiment will be hereinafter described.

Valve body 15' differs from valve body 15 primarily in the elimination of internally threaded hub 22.

Valve body 15' has a tubular connector member 70 secured thereto having a inlet opening 72 extending therethrough communicating with passage 20 extending through valve body 15'. The remainder of valve body 15' is the same as that of valve body 15 hereinbefore described.

Referring to FIG. 5 of the drawing, tubular body 60' comprises a syringe having a hollow outer tubular cover 74 having a internally threaded cap 76 secured in the lower end thereof. A transparent sleeve 78 has opposite ends urged into sealing engagement with gaskets 78a and 78b adjacent opposite ends of cover 74. Sleeve 78 is preferably constructed of inert material such as glass. Sleeve 78 is maintained in position by cap 79 threadedly secured to the upper end of cover 74.

A plunger 80 is slideably disposed in sleeve 78 and is moveable longitudinally therethrough by actuating rod 82 extending through a central passage formed in cap 79.

A connector 84 is threadedly secured to cap 76 and has an outlet opening 86 extending therethrough. A fill opening 88 extends through the wall of connector 84 and has an externally threaded bushing 90 threadedly secured therein. Bushing 90 has a hollow passage 92 extending therethrough and a valve seat 94 formed in the inner end thereof. A check ball 95 is positioned to seal passage 92 when plunger 80 is moved downwardly pressurizing liquid in outlet passage 86.

Bushing 90 has a nipple 96 on the outer end thereof which extends into conduit 98 connected to a source 100 of liquid.

The lower end of connector 84 has a nozzle 102 formed thereon which is positionable in inlet passage 72 formed in a valve body 15'. A guide sleeve 104 is axially positioned about nozzle 102 forming an annular recess into which the upper end of nipple 70 extends. An O-ring seal 106 is positioned to seal space between connector 84 and nipple 70.

The operation of the second embodiment of the apparatus is as follows:

Conduit 98 is attached to bushing 90 and actuating rod 82 is moved upwardly thereby moving plunger 80 upwardly through sleeve 78 drawing liquid from source 100 into sleeve 78. Connector 84 is then positioned in relation to valve body 15 as illustrated in FIG. 5 and plunger 80 is moved downwardly to dispense a desired quantity of liquid from sleeve 78 into the passage 20 extending through valve body 15'.

Tubular body 60' can be recharged repeatedly as hereinbefore described and upon movement of plunger 80 downwardly through sleeve 78 the volume of sleeve 78 containing liquid is reduced causing the liquid to be ejected therefrom and injected into the pressurizable container 1.

From the foregoing it should be readily apparent that each of the described embodiments of the invention accomplish the objects hereinbefore set forth in that other and further embodiments of the invention may be devised without departing from the basic concept thereof.

Having described my invention, I claim:

1. A process of injecting pesticide into a pressurizable container for spraying pesticide and water comprising the steps of: depositing a measured quantity of pesticide in a hollow tubular body having an outlet passage; detachably securing the tubular body to a valve body secured to the container; forming a fluid-proof seal between the tubular body and the valve body; venting the pressurizable container such that the interior of the container is at atmospheric pressure; moving a valve element in the valve body to a position such that a passage through the valve communicates with the inside of the container; increasing pressure inside the hollow tubular body to transfer the measured quantity of pesticide from the tubular body through the valve into the container; moving the valve element in the valve body to close the passage through the valve body; disconnecting the tubular member from the valve body on the container; depositing water in the container such the water is mixed with the measured quantity of pesticide in the container; and pumping air into the container such that pressure inside the container is greater than atmospheric pressure.

2. The process of claim 1 wherein the step of depositing a measured quantity of pesticide in a hollow tubular body comprises: removing a measured quantity of pesticide from a source of pesticide and depositing the measured quantity of pesticide into a container for mixing the pesticide with water to form a sprayable, accurately proportioned, solution of water and pesticide, comprising the steps of: connecting the hollow tubular body to the source of pesticide; and forming a controlled vacuum in the hollow tubular body to draw a measured quantity of pesticide from the source of pesticide into the hollow tubular body.

3. The process of claim 2 wherein the step of forming a controlled vacuum in the hollow tubular body to draw a measured quantity of pesticide from the source of pesticide into the hollow tubular body comprises the step of: moving a plunger through the hollow tubular body to create a vacuum in the tubular body.

4. The process of claim 1 wherein the hollow tubular body comprises a flexible tube having a sealed end and a hollow neck on another end thereof, and the step of increasing pressure inside the hollow tubular body to transfer the measured quantity of pesticide from the tubular body through the valve into the container comprises the step of moving a slotted dispensing clip over the sealed end of the tube and toward the neck on the other end of the tube.

5. Pesticide sprayer apparatus comprising: a container; a hose having a first end communicating with the inside of said container; a spray nozzle secured to a second end of said hose; pump means associated with said container to deliver liquid from said container through said nozzle; a valve body having a passage communicating with the inside of said container; a check-valve arranged to be urged by fluid pressure to a position closing the passage if pressure within said container exceeds pressure in the passage; a valve element in said valve body, said valve element being moveable between a first position opening said passage and a second position closing said passage; a hollow tubular body containing pesticide; connector means detachably securing said hollow tubular body to said valve body; and seal means arranged to sealingly engage a surface on said tubular body and a surface on said valve body when said tubular body is secured to said valve body.

6. The combination defined by claim 5 wherein said pump means comprises: an air pump secured to said container and adapted to deliver air to the inside of the container to increase pressure inside the container.

7. The combination called for in claim 5 wherein the hollow tubular body containing pesticide comprises: a flexible tube having a closed end and an outlet neck on the other end thereof.

8. The combination called for in claim 7 wherein said passage in the valve body communicating with the inside of the container is internally threaded; threads on the outlet neck on said tube; a resilient seal element in said outlet neck on the flexible tube; a hollow perforating element in said passage in the valve body; and means securing said perforating element such that when the threaded neck of the tube engages the internally threaded passage through the valve body the perforating element is urged through said seal element in the neck of the tube.

9. In a sprayer for chemical pesticides: a container; means to pressurize said container; a hose; means connecting said hose to said container; a spray nozzle; valve means connecting said spray nozzle to said hose to open and close a flow passage to said nozzle; a valve body having a passage therethrough communicating with the inside of said container; means securing said valve body to said container; a valve element rotatably disposed in said valve body, said valve element having a port formed therethrough and arranged to communicate with said passage through said valve body; means to rotate said valve element from a first position wherein said port communicates with said passage to a second position wherein said port and said passage do not communicate; a check valve in said passage to prevent escape of pressure from said container through said passage when said valve element is in said first position; a valve hub formed on said valve body about the exterior end of said passage; a tubular body closed at one end; an outlet nozzle on the opposite end of said tubular body; means to disengageably secure said outlet nozzle to said hub to communicate with said passage in said valve body, liquid pesticide in said tubular body; and means to move said liquid pesticide from said tubular body through said passage into said container.

10. The combination called for in claim 9 wherein the tubular body comprises: a sleeve; a first cap having a central passage therethrough; means securing said first cap to a first end of said sleeve; an actuating rod slideably disposed through said central passage in said first cap; and wherein the means to move said liquid pesticide comprises: a plunger slideably disposed in said sleeve; means securing said plunger to said actuating rod; a second cap having a passage communicating with the outlet nozzle on said tubular body; and means securing said second cap to the second end of said sleeve.

11. The combination called for in claim 10 with the addition of: a bushing disposed through an opening in said nozzle on said tubular body, said bushing having an interior end communicating with the inside of said nozzle; a source of liquid pesticide; means connecting the source of liquid pesticide to said bushing; and a check valve adjacent the interior end of said bushing adapted to close said bushing when the plunger is moved from the first end of said sleeve toward the second end of said sleeve and to open said bushing when the plunger moves from the second end toward the first end of said sleeve so as to allow liquid pesticide to move from the source of pesticide to the interior of said sleeve.

12. The combination called for in claim 10 with the addition of: a guide sleeve about said nozzle to guide said nozzle onto said valve hub; and seal means in said guide sleeve to prevent leakage of said pesticide to the exterior of said nozzle and valve body when pressure is applied to said actuating rod.

13. The combination called for in claim 9 wherein said tubular body comprises: a flexible container closed at one end; and wherein said means to move said liquid pesticide comprises: a clip positioned over said flexible container and adapted to squeeze said flexible container so as to force the liquid pesticide out the nozzle on said flexible container.

14. The combination called for in claim 13 wherein the means to disengageably secure said outlet nozzle to said hub comprises: external threads on said nozzle; internal threads on said hub; a seal formed of resilient material across the outer end of said outlet nozzle; and a perforating member secured inside said hub adapted to penetrate said seal allowing liquid pesticide to flow from said flexible container to said passage in said valve body.

* * * * *